Aug. 26, 1969  H. O. WIRES  3,463,981
"ON-OFF" SERVO CONTROL FOR A FLUID LEVEL SENSOR INCLUDING
A DIFFERENTIAL TRANSFORMER PICKOFF WITH LIMIT OVERRIDE
Filed Nov. 25, 1966  2 Sheets-Sheet 1
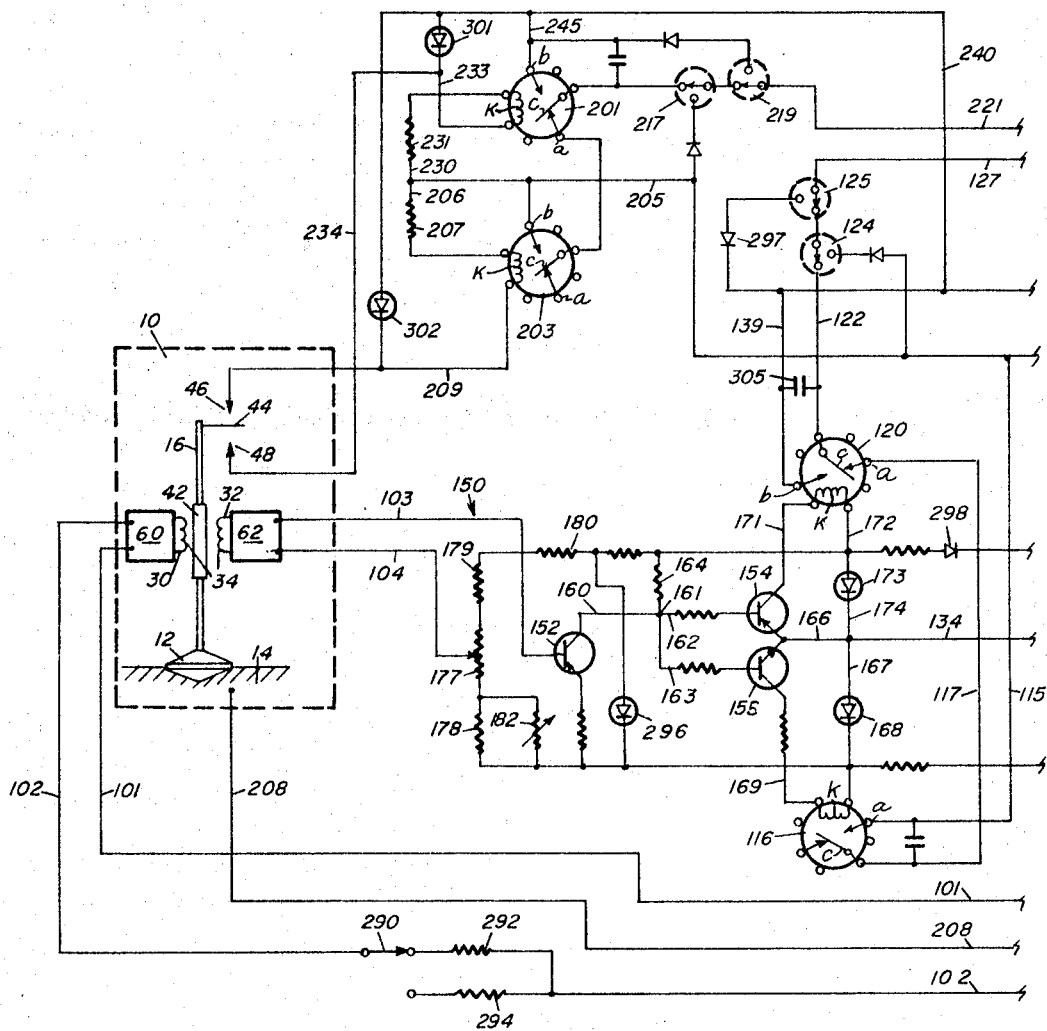
FIG. IA
INVENTOR
HAROLD O. WIRES
BY
ATTORNEYS Aug. 26, 1969

H. O. WIRES 3,463,981

"ON-OFF" SERVO CONTROL FOR A FLUID LEVEL SENSOR INCLUDING
A DIFFERENTIAL TRANSFORMER PICKOFF WITH LIMIT OVERRIDE

Filed Nov. 25, 1966

INVENTOR
HAROLD O. WIRES

3,463,981
"ON-OFF" SERVO CONTROL FOR A FLUID LEVEL SENSOR INCLUDING A DIFFERENTIAL TRANSFORMER PICKOFF WITH LIMIT OVERRIDE

Harold O. Wires, Columbus, Ohio, assignor to the United States of America as represented by the Secretary of the Interior
Filed Nov. 25, 1966, Ser. No. 597,149
Int. Cl. G05b 11/00
U.S. Cl. 318—18      7 Claims

ABSTRACT OF THE DISCLOSURE

A control system for bidirectional electric motors which are operable as a drive and overdrive for a follow-up mechanism having utility as part of a motored manometer for indicating and recording fluid level variations. Use is made of a liquid level detector arrangement including a linear differential transformer having a float actuated armature which provides directive signals to motor control circuitry. Vertical displacements of the armature determine the polarity of transformer output signals to the motor control circuitry establishing directional operation of the drive motor, and a selective closure of switch contacts effective in another part of the motor control circuitry establishing directional operation of the overdrive motor.

---

Figure 1B:
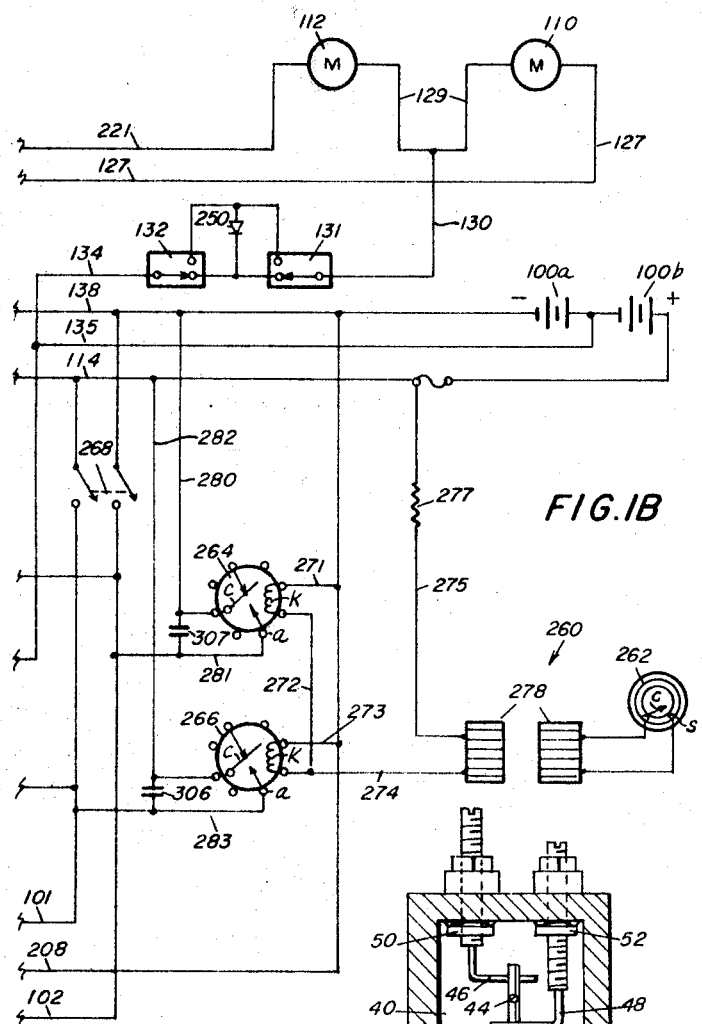

This invention relates to a motor control system wherein displacements of a detector device determines a system operation which controls a follow-up drive motor also acting to position registering and recording mechanisms furnishing data indicative of such displacements. In particular, this motor control system directs the operation of a servo arrangement to closely follow the detector displacements while it improves the operational characteristics of the servo's null seeking functions. The invention additionally entails an improved detector mechanism, having long-lasting sensitivity, which instantly converts displacements to system control signals. This detector mechanism includes as integral parts thereof a movable core constituting an armature of a differential transformer transducer, and an arrangement of switching components in an ancillary motor control circuit. A control signal producing structure comprising the differential transformer, supplies a direct current signal, whose polarity and voltage is commensurate with the direction and magnitude of a particular displacement of the armature, to a bistable switch control circuit. Operation of a motor mechanism driving the follow-up system of the servo, and the indicating and recording mechanisms therewith, is directed by the operation of this switch control circuit. Extreme displacements of the detector armature make operable the switching components associated therewith to enable the operation of the further motor control circuitry effectuating a motor drive to the follow-up which overrides the drive previously initiated.

The present invention can be advantageously used in connection with measuring and recording systems such as disclosed in Patent No. 2,942,466, granted to E. G. Barron and Harold O. Wires on June 28, 1960, on a motored manometer for indicating and recording fluid level variations. As explained in this earlier patent, fluid level variations are sensed by a pressure fluid enclosed in a conduit having one end submerged in the probed fluid. The other end of the conduit opens into the upper part of a first or pressure sensing housing containing a supply of mercury. A further conduit normally maintained filled with mercury completes a passage from an opening in the bottom of the sensing housing to an opening in the bottom of a second housing. A motor driven threaded shaft supports the sensing housing for vertical displacement therealong in alternate directions between points situated below the second housing. A float in the second housing rests on mercury drained therein from the top of the mercury column defined by the contents of the further conduit in its association with the mercury under fluid pressure in the sensing housing. A vertically disposed rod, fixed to the float and pivoted near its lower end, is equipped with an electrical contact at its upper end which is normally located between, and out of contact with, a pair of spaced apart electrical contacts fixed to the second housing. Circuits supplying power for selectively energizing the motor to rotate the threaded shaft in opposing directions are completed through leads connecting the rod and housing contacts to a control circuit for the motor. Changes in the pressure communicated to the sensing housing, due to the fluid level variations sensed, moves the mercury level therein either up or down with the result that the float in the second housing is adjusted accordingly. Responsive to float movement the rod pivots to bring its contact against one or the other of its housing's contacts in correspondence with the rise and fall of the mercury between the housings. Circuits thus selectively completed to the motor give rise to the drives which rotate the threaded shaft in a follow-up sequence of a servo arrangement. The sensing housing is thereby vertically displaced along the shaft, and the conduit dependent between the housings functions as a manometer whose arms adjust to lengths which compensate for the pressure changes induced by he fluid level variations in the sensing housing. Consequently, the mercury level in the second housing is restored to a manometer null position or specifically that which maintains the float positioned to hold the rod contact out of touch with the housing contacts. An indicating register and graphical recorder mechanism are connected by appropriate gearing elements to the motor shaft such that the motor also serves as the activating force thereto when it operates to drive the servo follow-up.

The present invention is adaptable as a substitute for the herein above described Barron et al. patent's rod controlled contact arrangement in the second housing, and the motor control circuit responsive thereto. Loss of sensitivity due to pitting and oxidation of contacts used in the patented pickup system is eliminated by the present invention. In addition, the invention disclosed herein facilitates increased top limits for the following rate and simultaneously reduces speed of null positioning to reduce hunting.

An object of the present invention therefore is to provide an improved incident detector and follow-up drive control for a motor drive system.

Another object of the present invention is to provide a differential transformer arrangement including an incident detector element which functions in multiple motor control circuits of a servo follow-up system.

A still further object of the present invention is to provide rapidly responsive motor control circuits for a servo follow-up system.

Figure 2:
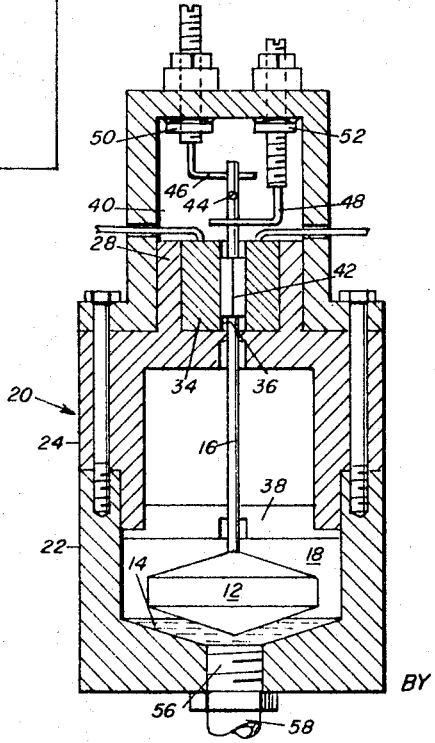

The foregoing and other important objects and advantages of the invention will become apparent from the following description of a preferred embodiment of the invention when taken together with the accompanying drawing wherein:

FIGS. 1A and 1B constitute a circuit diagram of the motor control circuits, including a schematic showing of a detector, employed in the preferred embodiment of the invention, and FIG. 2 is a showing, partly in cross-section, of the detector schematically illustrated in FIG. 1.

In FIG. 1A a fluid level sensing and signal transducer arrangement is represented within the dash-line enclosure 10 as including a stainless steel float 12 resting on a pool of mercury 14. Referring to FIG. 2, float 12 is shown to have extending centrally from the top thereof a slender rod or stem 16 which is supported to maintain the float symmetrically disposed wihin a chamber 18 at the lower part of a detector housing 20. Chamber 18 is defined by a cup-like casing 22 into whose top opening is fitted a lower rim extension of a central support component 24. Completing housing 20 is a cap-like casing 26 which slips over a socket element 28 forming at the top of component 24 an integral part thereof. A hole in a base flange of casing 26 in alignment with a hole through component 24 and a threaded hole in casing 22, receive a long bolt which fastens these parts together in forming housing 20.

Superimposed primary winding 30 and opposed secondary windings 32, appearing separated in FIG. 1A, constitute a cylindrical coil 34 having a central passage 36 as shown in FIG. 2. Coil 34 is set completely within a conforming pocket of socket 28 which aligns its passage 36 with openings through the base of the socket and a closure member 38 fitting over a base opening into a large hollow portion of component 24. Stem 16 passes through the centrally aligned openings in elements 28 and 38, and projects through coil passage 36 whereby it extends up into a chamber 40 defined within upper casing 26. An enlarged segment of stem 16 residing within passage 36, constitutes an armature 42 of the differential transformer. A pin 44 extending laterally from the projected part of stem 16, is normally situated between two contact fingers 46 and 48 having relatively long threaded portions which are adjustable in a pair of mounting sleeves 50 and 52, securely fastened in the upper face of casing 26. These sleeves allow relative positional adjustments of fingers 46 and 48 with respect to pin 44 whereby these fingers can be selectively set to engage the pin in the event it is displaced predetermined distances from a centered position. Thus sleeves 50 and 52 facilitate any repositioning of the contact fingers with respect to the throw of pin 44. A threaded opening 56, centrally located in the bottom of casing 22, has secured herein a conduit 58 through which mercury enters chamber 18 to form pool 14. As was heretofore explained, mercury flows and ebbs through a connection such as conduit 58 in response to variations in pressure, induced by fluid level changes, which are applied to a further pool of mercury in a sensing housing wherein the other end of the conduit opens.

Cooperatively related in detector-transducer arrangement 10 are the differential transformer comprising coil structure 34 and an armature 42 acting therein along the common axis thereof, an oscillator driver 60, and a demodulator 62. Power energizing these parts is provided by a circuit completed through leads 101 and 102 from a primary source represented in FIG. 1B as a pair of serially connected batteries 100a and 100b. Coil winding 32 is made up of separate, oppositely wound inductive elements of winding 32, no detector output is present. lator output to primary winding 30, give rise in the opposed secondaries of coil 32 to equal and opposite direct current potential inputs for demodulator 62. Therefore, when armature 42 is centrally disposed in coil 34 so as to be equally effective to aid flux produced in both elements of winding 32, no detector otuput is present. However, vertical displacements of armature 42 due to float activity, which can be as little as .004 of an inch, redistributes the flux density through the elements of coil 32 wherefore a potential difference input is produced for demodulator 62. Consequently, a D.C. voltage output is received on leads 103 and 104 the magnitude and polarity of which corresponds to the relative displacement of armature 42 from a centered or null position. In the embodiment described herein, disposition of armature 42 above a null position gives rise to negative D.C. voltage on lead 103 with respect to lead 104 and when disposed below null position, the armature acts to produce a positive voltage between these leads. A more detailed description of differential transformer circuitry having utility in the detecting arrangement of the present invention can be had by reference to Patent No. 3,235,790, granted Feb. 15, 1966, to G. L. Collins.

In view of the foregoing it can be seen that any perceptible change in the level of the mercury in pool 14 is immediately translated into a directional voltage which, as will be hereinafter more fully explained, is effective to initiate an appropriate follow-up control for repositioning the displaceable sensing housing in such manner as to restore the level of pool 14 toward a null producing condition. A motor 110 is provided to drive this follow-up arrangement until limits are reached whereupon an overdrive motor 112 is also made effective for that purpose. In an exemplary construction, motor 110, rotating at 1.3 r.p.m., is operable for any displacements of stem 16 beyond null position which carries pin 44 within the space between contact fingers 46 and 48, but out of contact therewith. An overdrive motor 112 suitable for this construcion is operable at 23 r.p.m. by an energizing circuit completed through pin 44 and contact fingers 46 or 48, to rotate in a direction determined by the particular contact finger affected.

The circuit in which motor 110 is energized whereby it functions to restore a rising armature toward null position includes leads 114, 115 which connect the positive terminal of a direct current source 100b to a single pole double throw switch of a relay 116 by way of its contact 116a and actuated contact arm 116c, normally open at the contact lead, 117 and to a switch of a further relay 120 by way of its contact 120a and contact arm 120c, normally closed at the contact lead 122, serially connected normally closed switches 124 and 125, and lead 127, and a return circuit by way of leads 129, 130, serially connected normally closed switches 131 and 132, leads 134 and 135 to the negative terminal of source 100b. The corresponding circuit by means of which a falling armature is restored towards null position includes leads 138, 139, connecting the negative terminal of a direct current source 100a to the switch of relay 120 by way of its contact 120b, and actuated contact arm 120c, normally open at the contact, lead 122, serially connected normally closed switches 124 and 125, lead 127, and the aforesaid return circuit of leads 129, 130, switches 131 and 132, and leads 134 and 135 to the positive terminal of source 100a. Relay contact arm 120c is thus also operative as an interlock between these motor drive directional control circuits since it is disposed to disable one of the respective circuits whenever it is effective to complete the other.

The contact arms of relays 116 and 120 are actuated by relay coils 116k and 120k, respectively, when these coils are selectively energized by a directional control differential amplifier circuitry 150. Comprising this control amplifier is a PNP transistor 152 whose collector is joined to a lead 160 which at a junction 161 connects to leads 162 and 163 from the bases of a PNP transistor 154 and NPN transistor 155. As was previously explained, relays 116 and 120 are alternatively activated by energization of their respective coils 116k and 120k in response to a predetermined operation of amplifier 150 in accordance with the displacements of armature 42 above or below its electrical center in coil structure 34, at manometer null position. Positive or negative D.C. transducer output is supplied between leads 103 and 104 as input to amplifier 150 depending on whether armature 42 is more effective above or below the electrical center. In an exemplary transducer construction gives a voltage excitation level of 2 volts on its primary coil 30, can provide approximately 4 milliamperes per thousandth of an inch displacement of armature 52, or 16 ma. per .004 inch of surface displacement of mercury 14, which is then the approximate threshold sensitivity of amplifier 150, and equals to .005 feet of water. Increased sensitivity that can be obtained by raising the input voltage to the transducer tends to create manometer null hunting.

At any time operation of the system arrives at a manometer null condition, a negative bias must nevertheless be supplied to transistor 152 to hold it at a conducting level such that appropriate potentials determined thereby are effective at both transistors 154 and 155 to bias them to cutoff. Since such negative bias is required at a null condition when potential between leads 103 and 104 is zero, this offset is provided by a voltage divider combination of resistors 180, 179, 177, 178, and 182, which is initially set by adjustment of the slider on resistor 177. After an appropriate, initial zero-set adjustment, the ratio of the total resistance of resistors 180, 179, and the top end of resistor 177, to the total resistance of the low end of resistor 177, and paralleled resistors 178, 182, is kept at a value which holds the proper bias to maintain a predetermined electrical center reasonably close over a temperature range of −30° F. to +130° F. by the variable resistance per degree F. characteristics of thermistor 182 in parallel with 178. A Zener diode 296 is also provided to hold a constant voltage on the voltage divider combination for further stabilization of the offset bias.

Responsive to an upward displacement of armature 42 in coil 34 past electrical center at the manometer null condition, a negative potential is derived on lead 103 with respect to lead 104. Transistor 152 is thus biased more negatively whereby it produces increased conduction in collector lead 160, and gives rise to a positive potential at circuit junction 161. As a result, the circuit including lead 163, base biases NPN transistor 155 into conduction which activates the circuit including leads 166, 167, voltage regulating Zener diode 168, and lead 169, for energizing relay coil 116k. The circuit thus completed through actuated relay contacts 116a-c, and normally closed relay contacts 120a-c, supplies power to motor 110 so as to energize it for a clockwise motor drive, as was hereinbefore described. The positive potential at junction 161 also base biases PNP transistor 154 into cut-off.

Downward displacement of armature 42 past electrical center in coil 34, which establishes a positive potential on lead 103 with respect to lead 104 acting to bias transistor 152 to less than its stand-by negative state, results in decreased conduction in lead 160 and gives rise to a negative potential at junction 161. Consequently, a circuit including lead 162, base biases PNP transistor 154 into conduction whereby a circuit including leads 171, 172, Zener diode 173, leads 174 and 166, energizes relay coil 120k. As a result, relay contacts 120b-c are actuated to complete the previously described circuit supplying power to motor 110 which energizes it for a counterclockwise motor drive. The negative potential at junction 161 also biases transistor 155 into cut-off. Resistor 164 in the transistor biasing circuitry, serves as a component of a voltage divider combination thereof, and the resistances shown in leads 162 and 163 of this circuitry constitute current limiters for transistors 154 and 155, respectively.

In the event the float structure comprising stem 16 and armature 42 thereon rises or falls a predetermined distance from the manometer null position thereof, further displacement of this structure is stopped by the engagement of the float structure pin 44 with finger contacts 46 or 48, respectively, and an overdrive becomes operative to reestablish the null level of the mercury in housing 20. The overdrive operation continues until pin 44 separates from the restraining contact finger, at which time only null positioning motor 110 remains effective. As was previously indicated, the control arrangement in which the contact fingers are operative, selectively energizes the circuits comprising the higher speed overdrive motor 112.

During a rising stage when pin 44 contacts finger 46, an energizing circuit is completed to motor 112 by way of quiescent relay 201, and operated relay 203. An energizing circuit for relay coil 203k is completed from the positive terminal of source 100b through leads 114, 205, 206, and current limiting resistor 207, and return circuitry including lead 209, pin 44 and finger 46 in contact therewith, the float structure, mercury pool 14, and lead 208 to the negative terminal of source 100a serially connected to source 100b. The activated relay coil effects closure of its contact arm 203c upon contact 203b of the relay whereby an energizing circuit to rotate motor 112 in a follow-up operation restoring the float structure toward null position is completed from the positive terminal of source 100b to the engaged relay parts 203b-c by way of leads 114, 205, and 211, and thence on lead 213 to relay 201 and the normally closed contact elements 201a-c thereof, lead 215, normally closed switches 217 and 219, and leads 221, 223, and through return circuitry including leads 225, 130, normally closed switches 131, 132, and leads 134, 135 to the negative terminal of source 100b.

In case of a falling stage where pin 44 engages contact finger 48, a circuit energizing relay coil 201k is completed from the positive terminal of source 100b, by way of leads 114, 205, 230, current limiting resistor 231, and by a return circuit including leads 233, 234, through contacts 44 and 48, the float structure, and mercury pool 14, and lead 208 to the negative terminal of source 100a connected serially to source 100b. The resultant closure of contact arm 201c upon contact 201b, functions to complete an energizing circuit to obtain rotation of motor 112 counter to its prior rotation, by way of leads 138, 240, and 245, connecting the negative terminal of source 100a through relay 201 parts 201b-c to lead 215, normally closed switches 217 and 219, leads 221, 223, and return circuitry completed through leads 225, 130, normally closed switches 131 and 132, lead 134 and 135, to the positive terminal of source 100a.

Normally closed switches 131 and 132 in the return circuitry of the several motor circuits open only when actuated by a structural part of the compensator housing as it reaches either end of its span of travel along the threaded shaft of the follow-up drive. Thus switches 131 and 132 constitute upper and lower limit switches for extreme compensator housing displacements up and down to counteract falling and rising mercury levels, respectively, in housing 20. A diode 250 connected across the limit switch contacts constitutes a high impedance in the return circuitry from the motors, and functions to disrupt the negative and positive currents therein when actuation of limit switches 131 and 132, respectively, occur as described. However, upon the subsequent application of an opposite motor polarity to institute a reversal of the motor drive, diode 250 allows a forward conduction therethrough which in turn facilitates energization of the motor circuitry. Thus, a drive to back away the structural part from the limit switch is obtained such that this switch closes to permit the resumption of normal operation.

Continuous operation of the motor controlling detector signal amplifier circuitry 150, heretofore described, may not be necessary wherefore a scheduled operation would be desirable to conserve power. The present invention provides for this purpose a time control arrangement 260, which is shown in FIG. 1B to comprise a clock-timer 262, a pair of relay operated switches 264 and 266, and a manually operable gang switch 268 having contacts for closure in the detector arrangement power input leads 101 and 102. An adjustable commutator segment 262s in the clock-timer is settable with respect to fixed contacts 262c therein, to allow the motor control circuitry 150 to become operationally effective only at predetermined times. In the connection, switch 268 is initially opened, as illustrated in FIG. 1B, so as to interrupt the normally constant power input on leads 101 and 102 to detector arrangement oscillator 60. The motor control circuitry is thus made ineffective since no control input therefor from the detector arrangement is forthcoming. However, any periodic closure of the clock timer contacts 262c and 262s, facilitates completion of energizing circuits for relay coils 264 k and 266k. These coils are connected in parallel circuits by lead pairs 271, 272, and 273, 274, respectively, across power leads 275 and 208 which extends from positive and negative terminals of source 100. Lead 275 contains a resistor 277, and together with lead 274 passes through a plug-in coupling 278, which electrically associates the clock-timer contacts with the aforesaid circuitry. Responsive to the energization of the relay coils, contact elements 264a and 264c, and 266a and 266c, are closed wherefore a circuit including lead 280, contacts of relay 264, and lead 281 is completed from the negative contact of source 100a to the detector power input lead 102, and a further circuit including lead 282, contact elements of relay 266, and lead 283 is completed from the positive terminal of source 100b to detector power input lead 101. Consequently, the detector oscillator 60 is restored to effectiveness, but is subject to subsequent time controlled openings of the timer contact elements 262c and 262s, which disables the power input to the detector arrangement as was previously explained.

If during any power interruptions induced by the clock-timer control the mercury level in housing 20 varies to either limit set by adjustments of finger contacts 46 and 48, the overdrive motor 112 would become operative to reposition the level within the aforesaid setting since the control arrangement therefor is not affected by the operation of switch 268.

Null sensitivity of the detector arrangement 10, specifically the inactive gap in the float displacement, can be adjusted from a narrow range to a wider range by a selective setting of a switch 290 to place either low resistance 292 or higher resistance 294 in the detector power input circuit lead 102. An alternative to these range resistances is a potentiometer in lead 102 for varying the voltage level to the primary of the differential transformer of the detector arrangement. Zener diode 296 provides voltage regulation over extremes of battery voltage from 10 to 12 volts. Diodes, such as 297 and 298, are placed in various leads throughout the circuts to assure protection to components from incorrect battery connections. Overdrive contact arc-suppression is established by Zener diodes 301 and 302. Capacitors such as condensers 304, 305, 306, 307 are also provided for spark suppression. Switches 124 and 125 are manually operable push buttons which are used to originate an energization of the null motor drive circuits and output relays 116 and 120, independently of any operation in detector arrangement 10. Similarly, switches 217 and 219 allow the initiation of a manually controlled drive by the overdrive motors without benefit of the pickup signal circuitry provided therefor. These switches provide means for a quick check of the power source batteries, and the motors, and allow system checkout by observation of null return after any such manually controlled displacement.

While a particular preferred embodiment of the present invention has been illustrated and described herein, it will be understood that this invention is not limited thereto, but is susceptible to change in form and detail.

What is claimed is:

1. A positional condition sensing follow-up control apparatus comprising a positional condition detector device including a signal generating component wherein a displaceable element is maintained to move freely relative thereto between preset limits whereby said element follows changes in said positional condition and determines the signal output from said generating component accordingly, circuit controlling signal producing means connected to said generating component and operatively responsive to said signal output, bi-directional motor drive means connected for operation in normally open motor energizing circuitry, a pair of remotely controlled switch means in said energizing circuitry operable to complete said circuitry for energizing said motor drive means, said pair of switch means including circuit interlock means restricting each said switch means of said pair thereof to be separately operable in response to electrically different outputs from said circuit controlling signal producing means to selectively complete said motor energizing circuitry and produce a motor drive in a predetermined direction, whereby said motor drive means is enabled to operate a follow-up drive mechanism effectuating a change of said positional condition in opposition to said positional change determining said signals from said generating component which by way of said circuit controlling outputs directs an operation of said motor drive means giving rise to said opposing change.

2. The control apparatus of claim 1 wherein said signal generating component of said detector device comprises a differential transformer including first and second superimposed windings connected to an oscillator driver and a demodulator, respectively, and a rod having as an integral part thereof an armature, said rod constituting said displaceable element being operative to position said armature within said windings, electrical connections joining said oscillator driver to a direct current source, and further electrical connections joining said demodulator to said circuit controlling signal producing means and supplying said generated output signal thereto as a direct current of predetermined polarity.

3. The control apparatus of claim 2 wherein an extension of said rod is displaceable above said windings, and carries fixed thereto an electrically conductive projection, a pair of spaced-apart electrical contact fingers adjustably secured in said device and defining the limits of a path along which said projection is displaceable between said fingers to follow said positional condition, said bidirectional motor drive means having a separate relatively higher speed driving component therein, electrical circuits including said projection and finger contacts and comprising operating means for normally open remotely controlled switch means, said circuits being operable to selectively energize said operating means to actuate said remotely controlled switch means in further energizing circuitry for said motor drive means, whereby engagement of said projection with one or the other of said contact fingers effectuates operation of said separate driving component of said motor drive means in one or another direction, respectively to activate said follow-up drive mechanism.

4. A positional condition sensing follow-up control apparatus comprising a positional condition detector device including a signal generating component wherein a displaceable element is maintained to move freely relative thereto between preset limits whereby said element follows changes in said positional condition and determines the signal output from said generating component accordingly, said signal generating component further comprising a differential transformer including first and second superimposed windings connected to an oscillator driver and a demodulator, respectively, and a rod having as an integral part thereof an armature, said rod constituting said displaceable element being operative to position said armature within said windings, electrical connections joining said oscillator driver to a direct current source, circuit controlling signal producing means connected to said generating component and operatively responsive to said signal output, further electrical connections joining said demodulator to said circuit controlling signal producing means and supplying said generated output signal thereto as a direct current of predetermined polarity, bidirectional motor drive means connected for operation in normally open motor energizing circuitry, remotely controlled switch means in said energizing circuitry operable to complete said circuitry for energizing said motor drive means, said switch means being operatively responsive to outputs from sai dcircuit controlling signal producing means to selectively complete said motor energizing circuitry and produce a motor drive in a predetermined direction, whereby said motor drive means is enabled to operate a follow-up drive mechanism effectuating a change of said positional condition in opposition to said positional change determining said signals from said generating component which by way of said circuit controlling outputs directs an operation of said motor drive means giving rise to said opposing change, an auxiliary switch means operable to open said electrical connections joining said oscillator driver to a direct current source and disrupt the operation of said signal generating component, additional remotely controlled switch means in additional circuitry which by-passes said auxiliary switch means, said additional switch means having normally in effective switch actuating means in further additional circuitry, a timing means comprising settable time controlled circuit closure elements in said further additional circuitry, said circuit closure elements being operable at preset times to actuate said further additional circuitry whereby said switch means to effect application of said additional circuitry to by-pass said auxiliary switch means and reconstitute direct current source connections to said signal generating component during said preset times.

5. A positional condition sensing follow-up control apparatus comprising a positional condition detector device including a signal generating component wherein a displaceable element is maintained to move freely relative thereto between preset limits whereby said element follows changes in said positional condition and determines the signal output from said generating component accordingly, said signal generating component further comprising a differential transformer including first and second superimposed windings connected to an oscillator driver and a demodulator, respectively, and a rod having as an integral part thereof an armature, said rod constituting said displaceable element being operative to position said armature within said windings, electrical connections joining said oscillator driver to a direct current source, circuit controlling signal producing means connected to said generating component and operatively responsive to said signal output, and further electrical connections joining said demodulator to said circuit controlling signal producing means and supplying said generated output signal thereto as a direct current of predetermined polarity, bidirectional motor drive means connected for operation in normally open motor energizing circuitry, remotely controlled switch means in said energizing circuitry operable to complete said circuitry for energizing said motor drive means, said switch means being operatively responsive to outputs from said circuit controlling signal producing means to selectively complete said motor energizing circuitry and produce a motor drive in a predetermined direction, whereby said motor drive means is enabled to operate a follow-up drive mechanism effectuating a change of said positional condition in opposition to said positional change determining said signals from said generating component which by way of said circuit controlling outputs directs an operation of said motor drive means giving rise to said opposing change, an extension of said rod being displaceable above said windings, and carrying fixed thereto an electrically conductive projection, a pair of spaced-apart electrical contact fingers adjustably secured in said device and defining the limits of a path along which said projection is displaceable between said fingers to follow said positional condition, said bidirectional motor drive means having a separate relatively higher speed driving component therein, electrical circuits including said projection and finger contacts and comprising operating means for normally open remotely controlled switch means, said remotely controlled switch means comprising relay operated switches having normally open contacts in said separate driving component energizing circuitry, and switch actuating coils therefor operatively responsive to the circuit controlling signals produced in accordance with signal outputs from said detector device determined by said limited positional conditions of said element, said electrical circuits being operable to selectively energize said operating means to actuate said remotely controlled switch means in said energizing circuitry for said separate driving component, whereby engagement of said projection with one or the other of said contact fingers effectuates operation of said separate driving component in one or another direction, respectively to activate said follow-up drive mechanism.

6. A positional condition sensing follow-up control apparatus comprising a positional condition detector device including a signal generating component wherein a displaceable element is maintained to move freely relative thereto between preset limits whereby said element follows changes in said positional condition and determines the signal output from said generating component accordingly, circuit controlling signal producing means connected to said generating component and operatively responsive to said signal output, said circuit controlling signal producing means comprising a pair of transistors each having a bias voltage polarity that is the reverse of the other, said transistors being selectively operative to conduct in response to a predetermined potential polarity at a circuit junction connected to the respective base terminals thereof, a further transistor, a voltage divider circuit electrically connected to said circuit junction and said further transistor and output connections from said signal generating component, said voltage divider circuit functioning to bias said further transistor for relatively low conduction through said junction and maintain thereby said pair of transistors at cut-off, said further transistor made operable to conduct variously with respect to said relatively low conduction by the summation of said output of said signal generating component with said voltage divider bias potential received at the base terminal of said further transistor, and operative thereby to control the potential at said circuit junction to different ones of said predetermined polarities, bidirectional motor drive means connected for operation in normally open motor energizing circuitry, remotely controlled switch means in said energizing circuitry operable to complete said circuitry for energizing said motor drive means, said switch means being operatively responsive to outputs from said circuit controlling signal producing means to selectively complete said motor energizing circuitry and produce a motor drive in a predetermined direction, whereby said motor drive means is enabled to operate a follow-up drive mechanism effectuating a change of said positional condition in opposition to said positional change determining said signals from said generating component which by way of said circuit controlling outputs directs an operation of said motor drive means giving rise to said opposing change.

7. A positional condition sensing follow-up control apparatus comprising a positional condition detector device including a signal generating component wherein a displaceable element is maintained to move freely relative thereto between preset limits whereby said element follows changes in said positional condition and determines the signal output from said generating component accordingly, said signal generating component further comprising a differential transformer including first and second superimposed windings connected to an oscillator driver and a demodulator, respectively, and a rod having as an integral part thereof an armature, said rod constituting said displaceable element being operative to position said armature within said windings, electrical connections comprising a selectively operable means for presetting the null sensitivity of said detector device joining said oscillator driver to a direct current source, circuit controlling signal producing means connected to said generating components and operatively responsive to said signal output, further electrical connections joining said demodulator to said circuit controlling signal producing means and supplying said generated output signal thereto as a direct current of predetermined polarity, bidirectional motor drive means connected for operation in normally open motor energizing circuitry, remotely controlled switch means in said energizing circuitry operable to complete said circuitry for energizing said motor drive means, said switch means being operatively responsive to outputs from said circuit controlling signal producing means to selectively complete said motor energizing circuitry and produce a motor drive in a predetermined direction, whereby said motor drive means is enabled to operate a follow-up drive mechanism effectuating a change of said positional condition in opposition to said positional change determining said signals from said generating component which by way of said circuit controlling outputs directs an operation of said motor drive means giving rise to said opposing change.

References Cited

UNITED STATES PATENTS

| | | |
|---|---|---|
| 2,555,674 | 6/1951 | Carrick. |
| 3,151,283 | 9/1964 | Armstrong et al. |
| 3,232,091 | 2/1966 | Glassey. |
| 3,237,070 | 2/1966 | Inaba et al. |
| 3,259,823 | 7/1966 | Miller. |

ORIS L. RADER, Primary Examiner

T. E. LYNCH, Assistant Examiner

U.S. Cl. X.R.

318—28, 29, 448